No. 707,856.
A. H. MARINDIN.
RANGE FINDER.
(Application filed Mar. 11, 1902.)
Patented Aug. 26, 1902.
(No Model.)
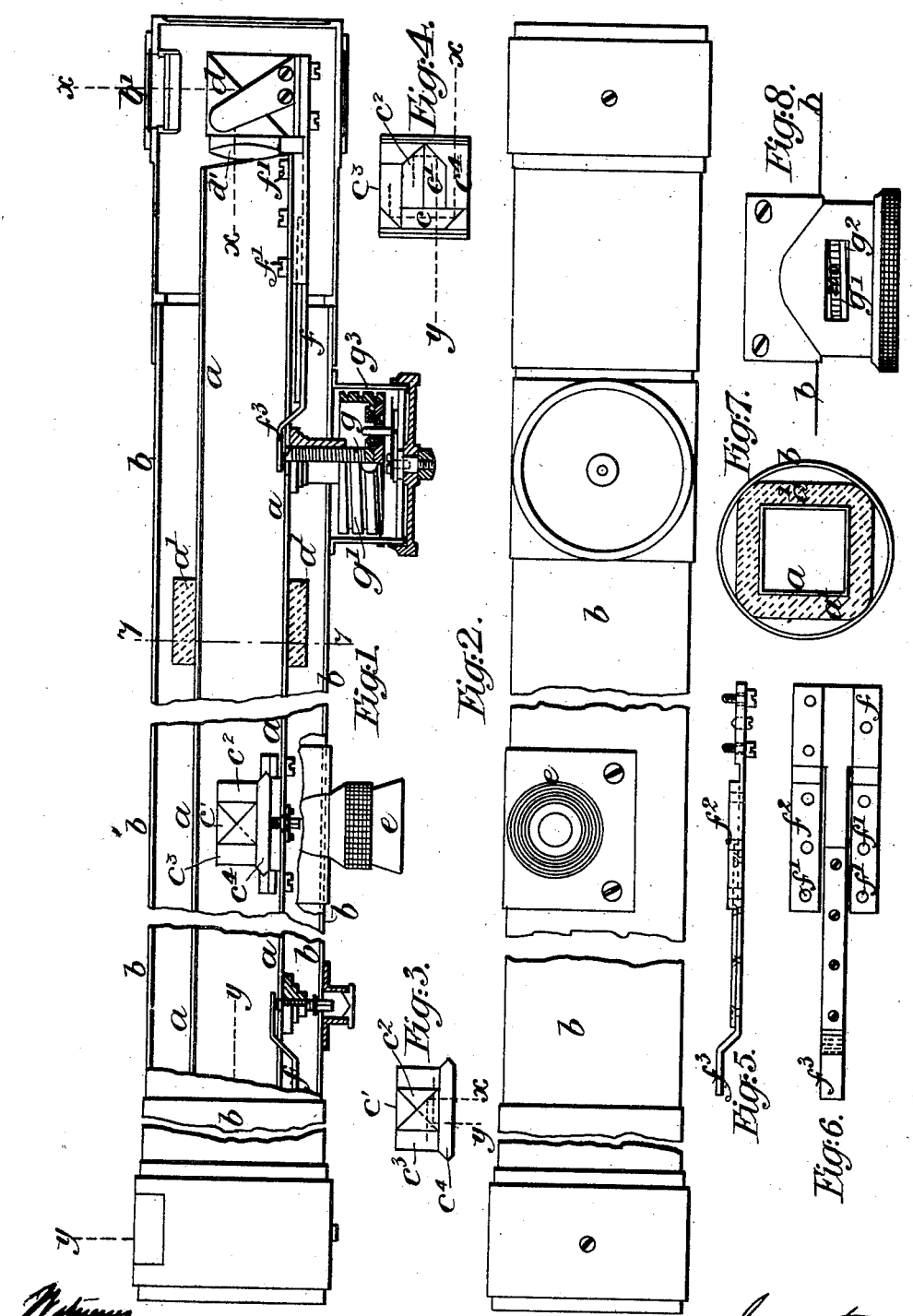

UNITED STATES PATENT OFFICE.

ARTHUR H. MARINDIN, OF DROITWICH, ENGLAND.

RANGE-FINDER.

SPECIFICATION forming part of Letters Patent No. 707,856, dated August 26, 1902.

Application filed March 11, 1902. Serial No. 97,716. (No model.)

*To all whom it may concern:*

Be it known that I, ARTHUR HENRY MARINDIN, a subject of the King of Great Britain, residing at Droitwich, in the county of Worcester, England, have invented certain new and useful Improvements in Range-Finders, of which the following is a full, clear, and exact description, and for which I have made application for patent in Great Britain, dated August 19, 1901.

My invention relates to that form of range-finder or telemeter in which two prisms or mirrors mounted near the ends of a tube or support reflect half-images through central prisms into an eyepiece, one of said end prisms being capable of adjustment by means of a micrometer-screw.

The object of the present invention is to construct a cheap instrument capable of accurate readings, which is extremely portable, and may therefore be used in a horizontal, vertical, or other position in which the image is seen erect, and which is not likely to be injured by accidents or extremes of temperature.

The invention is illustrated in the accompanying drawings, in which—

Figure 1 is a plan partly in section, and Fig. 2 is a rear elevation, of the complete instrument. Fig. 3 is a plan, and Fig. 4 is a rear elevation, of the central prism combination. Figs. 5 and 6 are two views at right angles showing the spring upon which the prisms are mounted. Fig. 7 is a section of the instrument on line 7 7 of Fig. 1. Fig. 8 is an external view of the case for the micrometer-screw.

In carrying the invention into effect I form the framework of two tubes $a$ and $b$. The inner tube $a$, which is preferably of square section, carries the central and end prisms $c$ and $d$, and the outer tube $b$ carries the eyepiece $e$. These tubes are connected together in such a manner as to leave the inner tube $a$ quite unconstrained by any small distortion of the outer tube $b$. One method of connecting these tubes is as follows: The inner tube $a$ has two or more thick india-rubber rings $a'$ stretched around the same, the exterior corners of which fit the interior of the tube $b$, as shown in Fig. 7. The inner tube $a$ is preferably plated and polished, so as to reflect heat instead of absorbing it. The end prisms $d$, which are of similar construction to each other and one only of which is shown, are preferably provided with object-glasses $d'$ on their adjacent or inner surfaces, which object-glasses are cemented thereto. Both prisms $d$ are mounted upon adjusting spring-levers $f$, one of which is used for primary adjustment, while the other one is used for finding the range. Each prism $d$ is mounted on one end of the spring-lever $f$, which is fixed to the inner tube $a$ by means of the screws $f'$ passing into the thickened edges $f^2$ of said spring. The free end $f^3$ of this spring, which acts as a lever, projects toward the center of the instrument and is preferably reduced in substance, so that very fine adjustment of the movable prism may be obtained by means of a micrometer-screw $g$ acting upon the outer end of such reduced or weaker portion of the spring, the head $g$ of which screw $g$ is divided to show through a slot $g^2$, see Fig. 8, the number of yards that an object is situated from the observer when the two half-images have been made to coincide. The central prism system, (see Figs. 3 and 4,) which receives the rays of light from the end prisms or reflectors $d$, erects the image and reflects the same into the eyepiece $e$, is preferably constructed in the following manner: On one side is arranged a vertical prism $c$, having a rectangular body with one end at right angles and one end sloping at an angle of forty-five degrees. To the longest or inner side of this vertical prism is cemented a horizontal prism $c'$, having a rectangular body and an outer sloping end at an angle of forty-five degrees. This prism $c'$ is cemented in position, so that its lower or shorter horizontal side is in line with the upper edge of the slope of the said vertical prism $c$. The space bounded on one side by the upper or longer face of the horizontal prism $c'$ and on another side by the inner face of the vertical prism $c$ contains a right angle prism $c^2$, having a sloping end at an angle of forty-five degrees, the outer edge of which coincides with the outer edge of the horizontal prism $c'$. Above the prisms $c$ and $c^2$ is arranged an oppositely-directed right-angle prism $c^3$, having a sloping end at an angle of forty-five degrees, the outer edge of which coincides with the outer edge of the vertical prism $c$.

A prism system as above described contains four pieces—the vertical, the horizontal, and the two right-angle prisms with sloping ends; but it may be built up of other numbers of prisms cemented together to produce the same effect. In the drawings the four prisms $c$ $c'$ $c^2$ $c^3$ are shown cemented to the carrier $c^4$, by means of which they are attached to the inner tube $a$. The beams coming from the end prisms $d$ are triply reflected within the central prism system $c$ $c'$ $c^2$ $c^3$, and they emerge parallel to one another from the adjacent surface of the said right-angle prisms $c^2$ $c^3$, arranged one above the other near to the eyepiece $e$. The beam $x$ passes into the instrument through the right-hand aperture $b'$. It is reflected by the adjacent prism $d$ through the object-glass $d'$ onto the lower sloping end of the prism $c$, as shown in Fig. 4. It then passes up through the prism $c$, striking the sloping end of the prism $c^3$, and is reflected onto the oblique face of the same prism $c^3$, and thence it passes through the carrier $c^4$ toward the eyepiece $e$, as shown in Fig. 3. The beam $y$ passes through its own prism $d$ and object-glass $d'$ (neither of which are shown) into the central prism, as shown in Fig. 4. Passing through the prism $c$ into the prism $c'$ it strikes the sloping end thereof and is reflected upward against the sloping end of the prism $c^2$. Thence it passes onto the oblique face of the same prism $c^2$ and toward the eyepiece $e$, as shown in Fig. 3. The outer casing $b$ is provided with apertures $b'$, through which the beams pass to the end prisms $d$.

The micrometer-screw $g$ may be protected by a casing $g^3$ carried by the outer tube $b$.

The whole instrument is small and light and may be carried by a man in the firing-line or on a sporting expedition. Owing to its portability it may be used in a vertical, horizontal, or other position, by which means horizontal and other lines may be made use of in finding the range, which is very useful in some countries in which buildings and vertical objects are scarce.

What I claim as my invention, and desire to secure by Letters Patent, is—

1. In a range-finder, the combination of a case, a fixed reflector at one end of the case, a movable reflector at the other end of the case, a spring carried by the case upon which such movable reflector is mounted, a micrometer-screw acting upon the outer end of the spring, a central combination of erecting-prisms receiving the images from the reflectors, erecting the same, and throwing half of each image at right angles to the case, and an eyepiece through which the half-images are viewed, substantially as set forth.

2. In a range-finder, the combination of a case, a fixed prism at one end thereof, a movable prism at the other end thereof, an object-glass cemented to the adjacent faces of said prisms, a spring carried by the case upon which such movable prism is mounted, a micrometer-screw acting upon the outer end of the spring, a central combination of erecting-prisms receiving the images from the end prisms, erecting the same, and throwing half of each image at right angles to the case, and an eyepiece through which the half-images are viewed, substantially as set forth.

3. In a range-finder, the combination of an outer tube, apertures in said outer tube, an inner tube, a fixed prism at one end of said inner tube, a movable prism at the other end of said inner tube, an object-glass cemented to the adjacent faces of said prisms, a spring fixed at one end to the inner tube upon which end said movable prism is mounted, a weaker portion of said spring projecting therefrom, a micrometer-screw acting upon the outer end of such weaker portion, thereby giving motion to the prism, a combination of prisms receiving the images from the end prisms, erecting the same, and throwing half of each image at right angles to the case, and an eyepiece through which the half-images are viewed, substantially as set forth.

4. In a range-finder, the combination of a case, a fixed reflector at one end thereof, an adjustable reflector at the other end thereof, a vertical prism having one end at right angles and one end sloping at an angle of forty-five degrees, a horizontal prism having one flat end and one end sloping at an angle of forty-five degrees, two oppositely-directed right-angle prisms arranged one above another, each having a sloping end at an angle of forty-five degrees, the lower of said right-angle prisms occupying the space between the upper face of the horizontal prism and the inner face of the vertical prism, and an eyepiece adjacent to the combination of prisms, through which the half-images are viewed, substantially as set forth.

5. In a range-finder, the combination of an outer tube, an inner tube, rubber rings stretched around the inner tube and fitting the outer tube, a fixed prism at one end of the inner tube, an adjustable prism at the other end of the inner tube, a spring fixed at one end to the inner tube upon the same end of which the adjustable prism is mounted, a weaker portion of said spring projecting therefrom, a micrometer-screw acting upon the end of the said weaker portion, thereby giving motion to the prism, a combination of prisms consisting of two rectangular prisms, each having one end at right angles and one end sloping at an angle of forty-five degrees, and two oppositely-directed right-angle prisms each having a sloping end, and an eyepiece adjacent to the combination of prisms, through which the half-images are viewed, substantially as set forth.

In testimony whereof I affix my signature in presence of two witnesses.

ARTHUR H. MARINDIN.

Witnesses:
B. J. B. MILLS,
CLAUDE K. MILLS.